(12) United States Patent
Su et al.

(10) Patent No.: US 11,431,578 B2
(45) Date of Patent: Aug. 30, 2022

(54) METHOD, APPARATUS, AND DEVICE FOR DETERMINING NETWORK ANOMALY BEHAVIOR, AND READABLE STORAGE MEDIUM

(71) Applicant: ZHENGZHOU YUNHAI INFORMATION TECHNOLOGY CO., LTD., Henan (CN)

(72) Inventors: Dongdong Su, Henan (CN); Wei Liu, Henan (CN); Deshan Zhang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 17/280,927

(22) PCT Filed: Aug. 30, 2019

(86) PCT No.: PCT/CN2019/103697
§ 371 (c)(1),
(2) Date: Mar. 29, 2021

(87) PCT Pub. No.: WO2020/147317
PCT Pub. Date: Jul. 23, 2020

(65) Prior Publication Data
US 2021/0344569 A1    Nov. 4, 2021

(30) Foreign Application Priority Data
Jan. 18, 2019    (CN) .......................... 201910051060.9

(51) Int. Cl.
*H04L 41/14*    (2022.01)
(52) U.S. Cl.
CPC ................................. *H04L 41/14* (2013.01)

(58) Field of Classification Search
CPC ....................................................... H04L 41/14
See application file for complete search history.

(56) References Cited

U.S. PATENT DOCUMENTS

| 2006/0257027 A1 | 11/2006 | Hero et al. | |
| 2015/0120717 A1* | 4/2015 | Kim | G06F 16/335 |
| | | | 707/727 |

(Continued)

FOREIGN PATENT DOCUMENTS

| CN | 103150435 A | 6/2013 |
| CN | 107194415 A | 9/2017 |

(Continued)

OTHER PUBLICATIONS

International Search Report for PCT/CN2019/103697 dated Nov. 28, 2019, ISA/CN.

(Continued)

*Primary Examiner* — Gil H. Lee
(74) *Attorney, Agent, or Firm* — Yue (Robert) Xu; Apex Attorneys at Law, LLP (57) ABSTRACT

Provided are a method, apparatus, device for determining a network anomaly behavior. The method includes: acquiring network data traffic in a target network, and determining each data packet contained in the network data traffic as a node of a complete graph, to construct a data complete graph; optimizing the data complete graph into a minimum spanning tree by a Kruskal algorithm, and determining each node of the minimum spanning tree as a cluster center; classifying all data packets contained in the network data traffic based on cluster centers, to acquire data element sets corresponding to the cluster centers respectively; and determining an anomaly behavior in the target network based on a type of each of the data element sets, wherein the type of (Continued)

the data element set is determined by a type of a network attack contained in the network data traffic.

19 Claims, 3 Drawing Sheets

(56) References Cited

U.S. PATENT DOCUMENTS

2015/0348406 A1* 12/2015 Fowe ............... G08G 1/096775
                                                              701/118
2016/0232254 A1*  8/2016 Chehreghani ....... G06F 16/9024
2018/0336437 A1* 11/2018 Cheng ................. G06K 9/6272

FOREIGN PATENT DOCUMENTS

CN           107766897 A      3/2018
CN           109858534 A      6/2019
WO     WO-2014000090 A1 *    1/2014    .............. H04W 4/33

OTHER PUBLICATIONS

Xianpeng Wang, Research on Grid-based MST Data Stream Clustering Algorithm, Chinese Master's Theses Full-text Database, Jun. 30, 2009.

Tsvetko Tsvetkov, et al., A Steiner tree-based verification approach for handling topology changes in self-organizing networks, 2016 12th International Conference on Network and Service Management (CNSM), Nov. 4, 2016.

* cited by examiner

METHOD, APPARATUS, AND DEVICE FOR DETERMINING NETWORK ANOMALY BEHAVIOR, AND READABLE STORAGE MEDIUM

This application is the national phase of International Application No. PCT/CN2019/103697, titled "METHOD, APPARATUS, AND DEVICE FOR DETERMINING NETWORK ANOMALY BEHAVIOR, AND READABLE STORAGE MEDIUM", filed on Aug. 30, 2019, which claims the priority to Chinese Patent Application No. 201910051060.9, titled "METHOD, APPARATUS, AND DEVICE FOR DETERMINING NETWORK ANOMALY BEHAVIOR, AND READABLE STORAGE MEDIUM", filed on Jan. 18, 2019 with the China National Intellectual Property Administration (CNIPA), which is incorporated herein by reference in its entirety.

FIELD

The present disclosure relates to the field of computer technology, and in particular to a method, an apparatus and a device for determining a network anomaly behavior, and a readable storage medium.

BACKGROUND

Currently, globalization of computer network has been basically realized. The huge network system facilitates the exchange and transmission of information, but also provides more convenience for network hackers. Nowadays, there are a variety of attack means in the network, such as DOS attack, Probing attack, R2L attack, U2R attack, or the like.

In the conventional technology, network data traffic in the network is generally classified by means of a clustering algorithm, so as to determine an anomaly behavior in the network based on a classification result. However, in the clustering algorithm used in the conventional technology, a cluster center is selected based on an average value of distances of data points, and as a result, when processing on non-spherical clusters, a clustering effect is not obvious and it is easy to fall into a local optimal solution, hence influencing an accuracy of the classification result, and reducing an efficiency and accuracy on classification of the network data traffic. Moreover, a network anomaly behavior cannot be accurately determined based on this classification result.

Therefore, how to improve the efficiency and accuracy on classification of the network data traffic is a problem required to be solved by those skilled in the art.

SUMMARY

The present disclosure aims to provide a method, an apparatus and a device for determining a network anomaly behavior, and a readable storage medium, so as to improve the efficiency and accuracy on classification of the network data traffic.

To achieve the above objectives, the technical solutions provided in embodiments of the present disclosure are as follows.

A method for determining a network anomaly behavior includes:

acquiring network data traffic in a target network, and determining each data packet contained in the network data traffic as a node of a complete graph, to construct a data complete graph;

optimizing the data complete graph into a minimum spanning tree by means of Kruskal algorithm, and determining each node of the minimum spanning tree as a cluster center;

classifying all data packets contained in the network data traffic based on cluster centers, to acquire data element sets corresponding to the cluster centers respectively; and determining an anomaly behavior in the target network based on a type of each of the data element sets, where the type of the data element set is determined by a type of a network attack contained in the network data traffic.

In an embodiment, after acquiring the data element sets corresponding to the cluster centers respectively, the method further includes:

calculating, for each of the data element sets, a ratio of an intra-cluster distance to an inter-cluster distance of the data element set, and determining whether ratios of the intra-cluster distance to the inter-cluster distance of all the data element sets are less than a preset first threshold;

performing steps of determining the anomaly behavior in the target network based on a type of each of the data element sets, in response to a positive determination.

In an embodiment, when there is a ratio greater than or equal to the preset first threshold, the method further includes:

updating each cluster center according to an objective formula, and performing steps of classifying all data packets contained in the network data traffic based on cluster centers to acquire data element sets corresponding to the cluster centers respectively, where the objective formula is: $G'=G(X,Y,Z), X=(x_1 m_1 + x_2 m_2 + \ldots + x_i m_i)/M, Y=(y_1 m_1 + y_2 m_2 + \ldots + y_i m_i)/M, Z=(z_1 m_1 + z_2 m_2 + \ldots + z_i m_i)/M$, where $G'$ represents an updated cluster center, M represents, before updating, a sum of distances between the cluster center and each data element in the data element set corresponding to the cluster center, and X, Y and Z respectively represent coordinates of the updated cluster center in a three-dimensional space; and $m_1, m_2 \ldots m_i$ respectively represent, before updating, a distance between each data element in the data element set and the cluster center corresponding to the data element set, $x_1, x_2 \ldots x_i$ respectively represent, before updating, a X coordinate value of each data element in the data element set mapped to the three-dimensional space, $y_1, y_2 \ldots y_i$ respectively represent, before updating, a Y coordinate value of each data element in the data element set mapped to the three-dimensional space, and $z_1, z_2 \ldots z_i$ respectively represent, before updating, a Z coordinate value of each data element in the data element set mapped to the three-dimensional space.

In an embodiment, before determining an anomaly behavior in the target network based on a type of each of the data element sets, the method further includes:

calculating a function value of an objective function, and determining whether a difference between the calculated function value and an initial function value is less than a preset second threshold; and performing steps of determining an anomaly behavior in the target network based on a type of each of the data element sets, in response to a positive determination.

In an embodiment, when the difference between the calculated function value and the initial function value is greater than or equal to the preset second threshold, the method further includes:

determining the calculated function value as the initial function value, and performing steps of updating each cluster center according to the objective formula.

In an embodiment, the classifying all data packets contained in the network data traffic based on cluster centers, to acquire data element sets corresponding to the cluster centers respectively includes:

acquiring, for each of the cluster centers, the data element set corresponding to the cluster center according to the following steps:

removing a target cluster center from the data packets contained in the network data traffic, to acquire a target data packet set;

calculating a distance between each data element in the target data packet set and the target cluster center, and determining whether each distance is less than a preset radius value;

and dividing a data element corresponding to a distance less than the radius value into a data element set corresponding to the target cluster center, in response to a positive determination.

In an embodiment, the method further includes:

calculating a first cosine similarity between a target data element and any one of the data elements in the data element set corresponding to the target cluster center, and a second cosine similarity between the target data element and any one of data elements in a data element set corresponding to an object cluster center, in a case that a first distance between the target data element and the target cluster center, and a second distance between the target data element and the object cluster center are both less than the radius value;

determining whether the first cosine similarity is greater than the second cosine similarity;

dividing the target data element into the data element set corresponding to the target cluster center, if it is determined that the first cosine similarity is greater than the second cosine similarity; and dividing the target data element into the data element set corresponding to the object cluster center, if it is determined that the first cosine similarity is less than or equal to the second cosine similarity.

An apparatus for determining a network anomaly behavior includes:

an acquisition module, configured to acquire network data traffic in a target network, and determine each data packet contained in the network data traffic as a node of a complete graph, to construct a data complete graph;

an optimization module, configured to optimize the data complete graph into a minimum spanning tree by means of Kruskal algorithm, and determine each node of the minimum spanning tree as a cluster center;

a classification module, configured to classifying all data packets contained in the network data traffic based on cluster centers, to acquire data element sets corresponding to the cluster centers respectively; and a determination module, configured to determine an anomaly behavior in the target network based on a type of each of the data element sets, where the type of the data element set is determined by a type of a network attack contained in the network data traffic.

A device for determining a network anomaly behavior includes:

a memory, configured to store a computer program; and a processor, configured to execute the computer program to implement steps of the method for determining a network anomaly behavior described above.

A readable storage medium storing a computer program, where the computer program is executed by a processor to implement steps of the method for determining a network anomaly behavior described above.

It can be seen from the above solutions that, the method for determining a network anomaly behavior according to an embodiment of the present disclosure includes: acquiring network data traffic in a target network, and determining each data packet contained in the network data traffic as a node of a complete graph, to construct a data complete graph; optimizing the data complete graph into a minimum spanning tree by means of Kruskal algorithm, and determining each node of the minimum spanning tree as a cluster center; classifying all data packets contained in the network data traffic based on cluster centers, to acquire data element sets corresponding to the cluster centers respectively; and determining an anomaly behavior in the target network based on a type of each of the data element sets, where the type of the data element set is determined by a type of a network attack contained in the network data traffic.

It can be seen that, when classifying the network data traffic according to the method, a data complete graph including each data packet is first constructed, the data complete graph is further optimized into a minimum spanning tree by means of Kruskal algorithm, and each node of the minimum spanning tree is determined as a cluster center, thereby avoiding problems that the clustering effect is not obvious and it is easy to fall into a local optimal solution caused by selecting a cluster center based on an average value of distances of data points. Furthermore, the network data traffic is classified based on cluster centers, to acquire data element sets corresponding to the cluster centers respectively, which can accurately determine an anomaly behavior existed in the target network, thus improving an efficiency and accuracy on classification of the network data traffic.

Accordingly, an apparatus and a device for determining a network anomaly behavior, and a readable storage medium are provided in embodiments of the present disclosure, and they also have the same technical effects described above.

BRIEF DESCRIPTION OF THE DRAWINGS

In order to illustrate technical solutions in embodiments of the present disclosure or in the conventional technology more clearly, the following will briefly introduce drawings used in the description of the embodiments or the conventional technology. It is apparent that the drawings described below only show some embodiments of the present disclosure, and other drawings may be obtained by those ordinary skilled in the art based on these drawings without creative efforts.

DETAILED DESCRIPTION

Hereinafter, technical solutions in the embodiments of the present disclosure will be described clearly and completely in conjunction with the drawings in the embodiments of the present disclosure. It is apparent that the embodiments in the following description are only some embodiments of the present disclosure, rather than all of the embodiments. Based on the embodiments of the present disclosure, all other embodiments obtained by those ordinary skilled in the art without any creative work fall within the scope of protection of the present disclosure.

A method, an apparatus and a device for determining a network anomaly behavior, and a readable storage medium are provided in embodiments of the present disclosure, so as to improve an efficiency and accuracy on classification of network data traffic.

Figure 1:
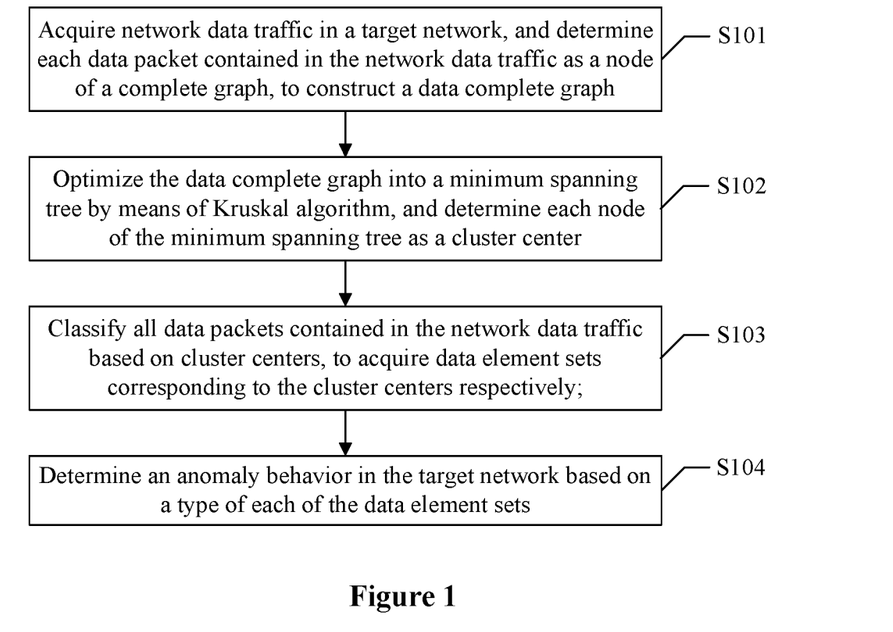
FIG. 1 is a flow chart of a method for determining a network anomaly behavior according to an embodiment of the present disclosure.

Reference is made to FIG. 1, which shows a method for determining a network anomaly behavior according to an embodiment of the present disclosure. The method includes steps S101 to S104.

In step S101, network data traffic in a target network is acquired, and each data packet contained in the network data traffic is determined as a node of a complete graph, to construct a data complete graph.

Specifically, the network data traffic includes various data packets transmitted in the network, such as a data packet with an attacking behavior and a data packet for normal network access. At present, types of network attacks include DOS attack, Probing attack, R2L attack, U2R attack, and the like. Each of the attacks has a certain feature. Therefore, upon classifying all the data packets contained in the network data traffic, data packets having a same or similar feature may be divided into one category, thus to determine a type of the attack existing in the network, that is, a network anomaly behavior.

In step S102, the data complete graph is optimized into a minimum spanning tree by means of Kruskal algorithm, and each node of the minimum spanning tree is determined as a cluster center.

It should be noted that the Kruskal algorithm can find the minimum spanning tree of the complete graph. The complete graph is a connected graph.

Specifically, the step of optimizing the data complete graph into a minimum spanning tree by means of Kruskal algorithm and determining each node of the minimum spanning tree as a cluster center includes the following operations.

Weights of all edges in the complete graph are calculated, to find points of an edge with the smallest weight, two points of the edge with the smallest weight are stored in a set A and the edge with the smallest weight is stored in a set B. Search for all the edges in the complete graph, so that the set A includes all points in the complete graph and the set B includes all the edges in the complete graph. The edges in the set B are arranged according to a weight of an edge.

Traverse the set B, and an edge with the smallest weight is added to a spanning tree. If a loop is formed, a current edge and two points corresponding to the current edge are removed from the spanning tree; otherwise, a next edge is added until the edges in the set B are completely added, to acquire a minimum spanning tree.

The minimum spanning tree is searched layer by layer. Two points with a minimum Euclidean distance in each layer are replaced with a center point O of the two points, and the set B and the set A are updated. The above operation is repeated until the minimum spanning tree includes only K connection points, and the search ends. The connection points of the minimum spanning tree are determined as cluster centers of the network data traffic.

In step S103, all data packets contained in the network data traffic are classified based on cluster centers, to acquire data element sets corresponding to the cluster centers respectively.

The step of classifying all data packets contained in the network data traffic based on cluster centers, to acquire data element sets corresponding to the cluster centers respectively includes the following operations.

For each of the cluster centers, the data element set corresponding to the cluster center is acquired according to the following steps: removing a target cluster center from the data packets contained in the network data traffic, to acquire a target data packet set; calculating a distance between each data element in the target data packet set and the target cluster center, and determining whether the distance is less than a preset radius value; and dividing a data element corresponding to a distance less than the radius value into the data element set corresponding to the target cluster center, in response to a positive determination.

For example, assuming the cluster centers include {a, b, c}, and an initial sample set formed by the data packets contained in the network data traffic is denoted as A, then:

for a cluster center 'a', the target data packet set A1 is A-a, and a data element whose distance is greater than the radius value is removed from A1 to acquire a data element set 'a', where the distance refers to a distance between any one of the data elements in the target data packet set and the cluster center 'a';

for a cluster center 'b', the target data packet set A1 is A-b, and a data element whose distance is greater than the radius value is removed from A1 to acquire a data element set 'b', where the distance refers to a distance between any one of the data elements in the target data packet set and the cluster center 'b'; and for a cluster center 'c', the target data packet set A1 is A-c, and a data element whose distance is greater than the radius value is removed from A1 to acquire the data element set 'c', where the distance refers to a distance between any one of the data elements in the target data packet set and the cluster center 'c'.

In this way, the data element sets corresponding to the cluster centers are acquired respectively.

The method further includes:

calculating a first cosine similarity between a target data element and any one of the data elements in the data element set corresponding to the target cluster center, and a second cosine similarity between the target data element and any one of data elements in a data element set corresponding to an object cluster center, in a case that a first distance between the target data element and the target cluster center, and a second distance between the target data element and the object cluster center are both less than the radius value;

determining whether the first cosine similarity is greater than the second cosine similarity;

dividing the target data element into the data element set corresponding to the target cluster center, if it is determined that the first cosine similarity is greater than the second cosine similarity; and dividing the target data element into the data element set corresponding to the object cluster center, if it is determined that the first cosine similarity is less than or equal to the second cosine similarity.

That is, in a case that a data element is located at a clustering boundary, the data element set to which the data element belongs is determined by the cosine similarity.

A calculation formula of the cosine similarity is expressed by:

$$\cos(x, y) = \frac{\sum_{k=1}^{n} x_k y_k}{\sqrt{\sum_{k=1}^{n} x_k^2} \sqrt{\sum_{k=1}^{n} y_k^2}}$$

Where n represents a data dimension, X represents a data element at the clustering boundary, and Y represents any one of the data elements in the data element set.

In step S104, an anomaly behavior in the target network is determined based on a type of each of the data element sets.

The type of the data element set is determined by a type of a network attack contained in the network data traffic.

It should be noted that in a case that the data packets contained in the network data traffic are all for normal access, the acquired data element set is a normal data set; in a case that the data packets contained in the network data traffic include data packets for normal access and data packets of DOS attack, the acquired data element set is a normal data set and a DOS attack set. That is, the type of the data element set depends on the type of the data packet contained in the network data traffic.

In a case that the types of the data packets contained in the network data traffic include data packets of DOS attack, Probing attack, R2L attack and U2R attack, and a normal data packet, the acquired data element set is a DOS attack set, a Probing attack set, a R2L attack set, a U2R attack set and a normal data set.

It can be seen that in the method for determining a network anomaly behavior according to the embodiment, when classifying the network data traffic by this method, a data complete graph including each data packet is first constructed, the data complete graph is further optimized into a minimum spanning tree by means of Kruskal algorithm, and each node of the minimum spanning tree is determined as a cluster center, thereby avoiding problems that the clustering effect is not obvious and it is easy to fall into a local optimal solution caused by selecting a cluster center based on an average value of distances of data points; furthermore, the network data traffic is classified based on cluster centers, to acquire data element sets corresponding to the cluster centers respectively, which can accurately determine an anomaly behavior existed in the target network, thus improving an efficiency and accuracy on classification of the network data traffic.

A method for determining a network anomaly behavior is provided according to another embodiment of the present disclosure. Compared with the above embodiment, the technical solution is further illustrated and optimized in this embodiment.

Figure 2:
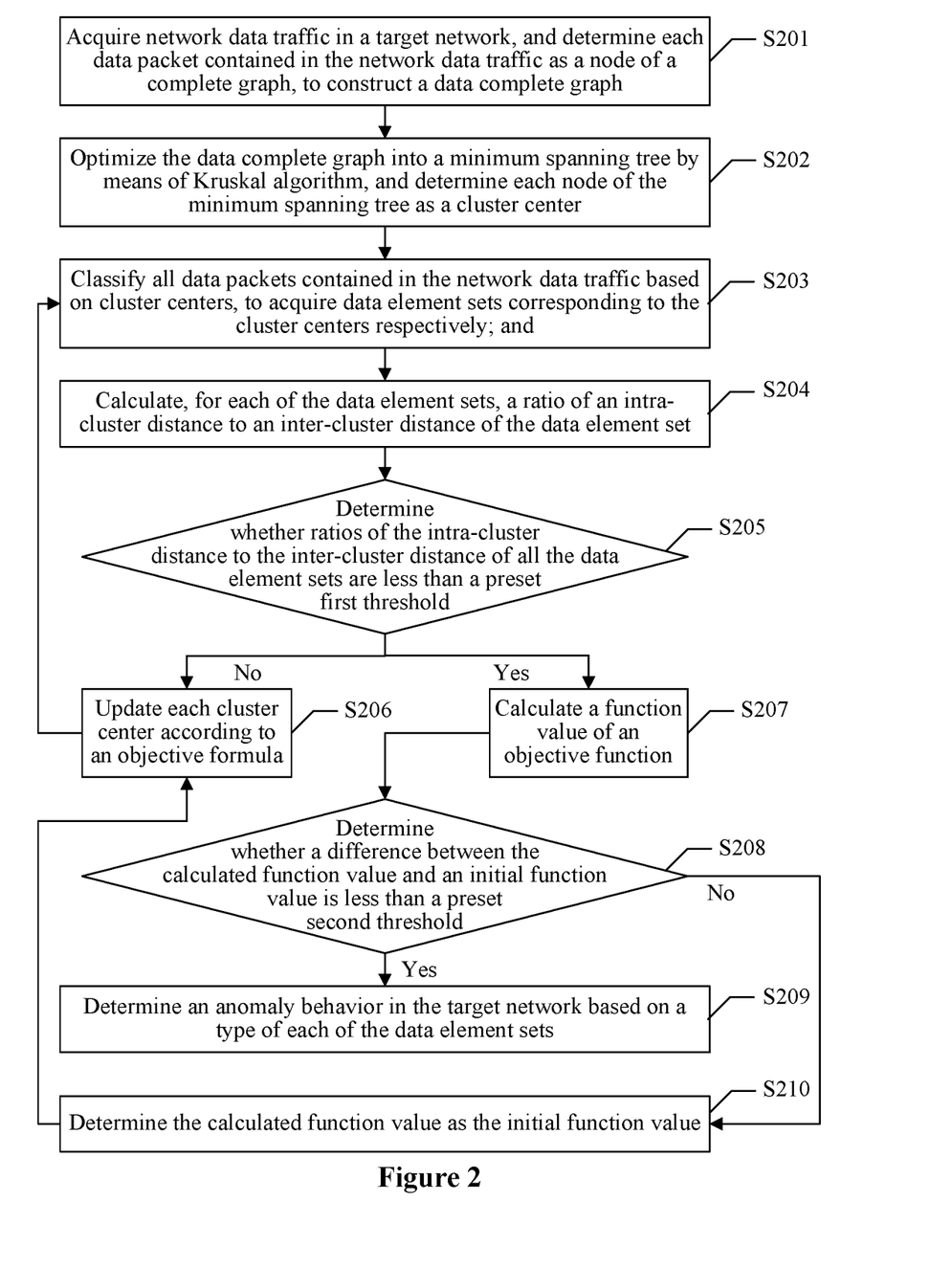
FIG. 2 is a flow chart of a method for determining a network anomaly behavior according to another embodiment of the present disclosure.

Reference is made to FIG. 2, which shows a method for determining a network anomaly behavior according to another embodiment of the present disclosure. The method includes steps S201 to S210.

In step S201, network data traffic in a target network is acquired, and each data packet contained in the network data traffic is determined as a node of a complete graph, to construct a data complete graph.

In step S202, the data complete graph is optimized into a minimum spanning tree by means of Kruskal algorithm, and each node of the minimum spanning tree is determined as a cluster center.

In step S203, all data packets contained in the network data traffic are classified based on cluster centers, to acquire data element sets corresponding to the cluster centers respectively.

In step S204, for each of the data element sets, a ratio of an intra-cluster distance to an inter-cluster distance of the data element set is calculated.

In step S205, it is determined whether ratios of the intra-cluster distance to the inter-cluster distance of all the data element sets are less than a preset first threshold. Proceed to step S207, in response to a positive determination; or, proceed to step S206, in response to a negative determination.

In step S206, each cluster center is updated according to an objective formula, and proceed to step S203.

In step S207, a function value of an objective function is calculated.

In step S208, it is determined whether a difference between the calculated function value and an initial function value is less than a preset second threshold. Proceed to step S209, in response to a positive determination; or, proceed to step S210, in response to a negative determination.

In step S209, an anomaly behavior in the target network is determined based on a type of each of the data element sets.

The type of the data element set is determined by a type of a network attack contained in the network data traffic.

In step S210, the calculated function value is determined as the initial function value, and proceed to step S206.

The objective formula is expressed by: $G'=G(X,Y,Z)$, $X=(x_1m_1+x_2m_2+\ldots+x_im_i)/M$, $Y=(y_1m_1+y_2m_2+\ldots+y_im_i)/M$, $Z=(z_1m_1+z_2m_2+\ldots+z_im_i)/M$.

$G'$ represents an updated cluster center, M represents, before updating, a sum of distances between the cluster center and each data element in the data element set corresponding to the cluster center, and X, Y and Z respectively represent coordinates of the updated cluster center in a three-dimensional space; and $m_1, m_2 \ldots m_i$ respectively represent, before updating, a distance between each data element in the data element set and the cluster center corresponding to the data element set, $x_1, x_2 \ldots x_i$ respectively represent, before updating, a X coordinate value of each data element in the data element set mapped to the three-dimensional space, $y_1, y_2 \ldots y_i$ respectively represent, before updating, a Y coordinate value of each data element in the data element set mapped to the three-dimensional space, and $z_1, z_2 \ldots z_i$ respectively represent, before updating, a Z coordinate value of each data element in the data element set mapped to the three-dimensional space.

It should be noted that, as the dimensionality increases, the amount of calculation will also increase exponentially. Therefore, in order to reduce the complexity of the calculation and improve the efficiency of the calculation, it may be simply performed two-dimensional (X and Y) space mapping in a practical test.

Each of data element sets may be regarded as a category, and thus the cluster center of the data element set is the cluster center of one category. In order to explain the objective formula more clearly, an example is as follows.

Assuming a data element set includes three data elements: a center data element 'O', a data element 'A1' and a data element 'A2', where a distance from 'A1' to 'O' is 'D1', a distance from 'A2' to 'O' is 'D2', coordinates of 'A1' mapped to the three-dimensional space are $(x_1, y_1, z_1)$, and coordinates of 'A2' mapped to the three-dimensional space are $(x_2, y_2, z_2)$, then $m_1=D1$, $m_2=D2$, $M=D1+D2$, $X=(x_1D1+$ $x_2D2$), $Y=(y_1D1+y_2D2)$, $Z=(z_1D1+z_2D2)$. Thus, coordinates of the updated cluster center in the three-dimensional space are $(X,Y,Z)$. In this way, the updated cluster center is acquired.

Specifically, the intra-cluster distance refers to an average value of distances between all data points in the cluster and the cluster center. If $C_j$ represents the cluster center and $X_i$ represents any one of data elements in a cluster with $C_j$ as the cluster center, then the intra-cluster distance DWC is expressed as the following formula:

$$DWC = \sum_{i=1}^{n_j} \frac{1}{n_j}(c_j, x_i)$$

Where n represents the number of data elements other than $C_j$ in the current cluster.

The inter-cluster distance refers to an average value of distances between the current cluster center and other cluster centers. The network data traffic is divided into three data element sets, that is, A, B, and C. A corresponds to a cluster center $A_j$, B corresponds to a cluster center $B_j$, and C corresponds to a cluster center $C_j$. The intra-cluster distance of A is one half of a sum of a distance from $A_j$ to $B_j$ and a distance from $A_j$ to $C_j$.

For the data element set acquired by classification, the closer distance between data elements in the set is the better, and the greater difference between different sets is the better. Therefore, when a ratio of an intra-cluster distance to an inter-cluster distance of a data element set is smaller, it indicates that the data element set is more accurate.

Specifically, in a case that the ratios of the intra-cluster distance to the inter-cluster distance of all the data element sets are less than the preset first threshold, the function value of the objective function is calculated, and it is determined whether the difference between the calculated function value and the initial function value is less than the preset second threshold. If the difference between the calculated function value and the initial function value is less than the preset second threshold, steps of determining an anomaly behavior in the target network based on a type of each of the data element sets are performed. If the difference between the calculated function value and the initial function value is greater than or equal to the preset second threshold, the calculated function value is determined as the initial function value, and steps of updating the cluster centers according to the objective formula are performed.

That is, when all the acquired data element sets meet conditions, it is determined whether all the data element sets are accurate enough based on the objective function again.

Specifically, the objective function is expressed as the following formula:

$$J = \sum_{i=1}^{n_k} \sum_{j=1}^{k} d_{ij}(x_i, c_j), d(x, y) = \sqrt{|x_1 - y_1|^2 + |x_2 - y_2|^2 + \ldots + |x_n - y_n|^2}$$

Where the objective function J represents a sum of squares of distances between all the points in each data element set and the cluster center corresponding to the current data element set. When J is a minimum value, that is, a minimum mean square error is acquired, it is determined that all the data element sets are accurate enough.

For example, assuming there are three data element sets A, B and C, the data element sets separately have two points $(A_1, A_2)$, $(B_1, B_2)$ and $(C_1, C_2)$ other than the cluster centers $(X_a, X_b, X_c)$, a distance between $A_1$ and $X_a$ is $D_{a1}$, a distance between $A_2$ and $X_a$ is $D_{a2}$, a distance between $B_1$ and $X_b$ is $D_{b1}$, a distance between $B_2$ and $X_b$ is $D_{b2}$, a distance between $C_1$ and $X_c$ is $D_{c1}$, and a distance between $C_2$ and $X_c$ is $D_{c2}$, then the function value of the objective function J is $D_{a1}^2 + D_{a2}^2 + D_{b1}^2 + D_{b2}^2 + D_{c1}^2 + D_{c2}^2$.

It can be seen that, in the method for determining a network anomaly behavior according to the embodiment, when classifying the network data traffic by the method, a data complete graph including each data packet is first constructed, the data complete graph is further optimized into a minimum spanning tree by means of Kruskal algorithm, and each node of the minimum spanning tree is determined as a cluster center, thereby avoiding problems that the clustering effect is not obvious and it is easy to fall into a local optimal solution caused by selecting a cluster center based on an average value of distances of data points. Furthermore, the network data traffic is classified based on cluster centers, to acquire data element sets corresponding to the cluster centers respectively. An accuracy of a clustering result is determined by a ratio of an intra-cluster distance to an inter-cluster distance of each data element set and the objective function, and when the clustering result does not meet conditions, the cluster center is updated and the clustering is performed again. In this way, the accuracy of the clustering result is improved, so that an anomaly behavior in the target network may be accurately determined based on the accurate clustering result.

An apparatus for determining a network anomaly behavior according to an embodiment of the present disclosure is described as follows. For the apparatus for determining a network anomaly behavior described hereinafter, reference may be made to the method for determining a network anomaly behavior in the above description.

Figure 3:
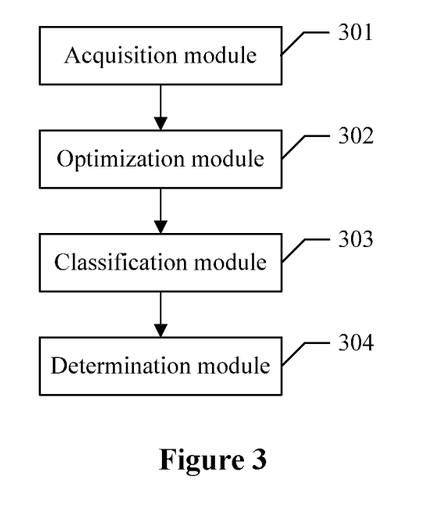
FIG. 3 is a schematic diagram of an apparatus for determining a network anomaly behavior according to an embodiment of the present disclosure.

Reference is made to FIG. 3, which shows an apparatus for determining a network anomaly behavior according to an embodiment of the present disclosure. The apparatus includes: an acquisition module 301, configured to acquire network data traffic in a target network, and determine each data packet contained in the network data traffic as a node of a complete graph, to construct a data complete graph;

an optimization module 302, configured to optimize the data complete graph into a minimum spanning tree by means of Kruskal algorithm, and determine each node of the minimum spanning tree as a cluster center;

a classification module 303, configured to classify all data packets contained in the network data traffic based on cluster centers, to acquire data element sets corresponding to the cluster centers respectively; and a determination module 304, configured to determine an anomaly behavior in the target network based on a type of each of the data element sets, where the type of the data element set is determined by a type of a network attack contained in the network data traffic.

The apparatus further includes:

a first determination module, configured to calculate, for each of the data element sets, a ratio of an intra-cluster distance to an inter-cluster distance of the data element set, and determine whether ratios of the intra-cluster distance to the inter-cluster distance of all the data element sets are less than a preset first threshold; and a first execution module, configured to perform the steps in the determination module, if it is determined that the ratios of the intra-cluster distance to the inter-cluster distance of all the data element sets are less than the preset first threshold.

The apparatus further includes an update module. The update module is configured to update each cluster center according to an objective formula, and perform steps of classifying all data packets contained in the network data traffic based on cluster centers to acquire data element sets corresponding to the cluster centers respectively, when there is a ratio greater than or equal to the preset first threshold.

The objective formula is expressed as: $G'=G(X,Y,Z)$, $X=(x_1m_1+x_2m_2+\ldots+x_im_i)/M$, $Y=(y_1m_1+y_2m_2+\ldots+y_im_i)/M$, $Z=(z_1m_1+z_2m_2+\ldots+z_im_i)/M$. $G'$ represents an updated cluster center, M represents, before updating, a sum of distances between the cluster center and each data element in the data element set corresponding to the cluster center, and X, Y and Z respectively represent coordinates of the updated cluster center in a three-dimensional space.

$m_1, m_2 \ldots m_i$ respectively represent, before updating, a distance between each data element in the data element set and the cluster center corresponding to the data element set, $x_1, x_2 \ldots x_i$ respectively represent, before updating, a X coordinate value of each data element in the data element set mapped to the three-dimensional space, $y_1, y_2 \ldots y_i$ respectively represent, before updating, a Y coordinate value of each data element in the data element set mapped to the three-dimensional space, and $z_1, z_2 \ldots z_i$ respectively represent, before updating, a Z coordinate value of each data element in the data element set mapped to the three-dimensional space.

The apparatus further includes:

a second determination module, configured to calculate a function value of an objective function, and determine whether a difference between the calculated function value and an initial function value is less than a preset second threshold; and a second execution module, configured to perform the steps in the determination module, if it is determined that the difference between the calculated function value and the initial function value is less than the preset second threshold.

The apparatus further includes a third execution module. The third execution module is configured to determine the calculated function value as the initial function value, and perform the steps in the update module, if it is determined that the difference between the calculated function value and the initial function value is greater than or equal to the preset second threshold.

The classification module is specifically configured to:

acquire, for each of the cluster centers, the data element set corresponding to the cluster center according to the following steps:

remove a target cluster center from the data packets contained in the network data traffic, to acquire a target data packet set;

calculate a distance between each data element in the target data packet set and the target cluster center, and determine whether each distance is less than a preset radius value; and divide a data element corresponding to a distance less than the radius value into the data element set corresponding to the target cluster center, in response to a positive determination.

The classification module is further configured to:

calculate a first cosine similarity between a target data element and any one of the data elements in the data element set corresponding to the target cluster center, and a second cosine similarity between the target data element and any one of data elements in a data element set corresponding to an object cluster center, in a case that a first distance between the target data element and the target cluster center, and a second distance between the target data element and the object cluster center are both each less than the radius value;

determine whether the first cosine similarity is greater than the second cosine similarity;

divide the target data element into the data element set corresponding to the target cluster center, if it is determined that the first cosine similarity is greater than the second cosine similarity; and divide the target data element into the data element set corresponding to the object cluster center, if it is determined that the first cosine similarity is less than or equal to the second cosine similarity.

It can be seen that the apparatus for determining a network anomaly behavior according to the embodiment includes the acquisition module, the optimization module, the classification module and the determination module. Firstly, the acquisition module acquires network data traffic in a target network, and determines each data packet contained in the network data traffic as a node of a complete graph, to construct a data complete graph. Then, the optimization module optimizes the data complete graph into a minimum spanning tree by means of Kruskal algorithm, and determines each node of the minimum spanning tree as a cluster center. Further, the classification module classifies all data packets contained in the network data traffic based on cluster centers, to acquire data element sets corresponding to the cluster centers respectively. Finally, the determination module determines an anomaly behavior in the target network based on a type of each of the data element sets, where the type of the data element set is determined by a type of a network attack contained in the network data traffic. In this way, the modules collaborates and performs their functions respectively, so as to improve the efficiency and accuracy on classification of the network data traffic, thereby accurately determining the anomaly behavior existed in the target network.

A device for determining a network anomaly behavior according to an embodiment of the present disclosure is described as follows. For the device for determining a network anomaly behavior described hereinafter, reference may be made to the method and the apparatus for determining a network anomaly behavior in the above description.

Figure 4:
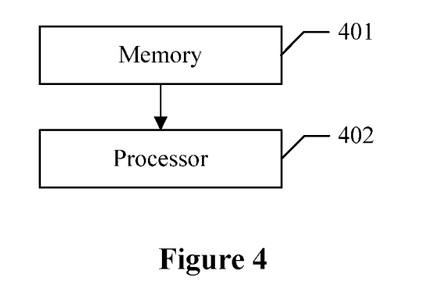
FIG. 4 is a schematic diagram of a device for determining a network anomaly behavior according to an embodiment of the present disclosure.

Reference is made to FIG. 4, which shows a device for determining a network anomaly behavior according to an embodiment of the present disclosure. The device includes:

a memory 401, configured to store a computer program; and a processor 402, configured to execute the computer program to implement steps of the method for determining a network anomaly behavior according to any one of the above embodiments.

A readable storage medium according to an embodiment of the present disclosure is described as follows. For the readable storage medium described hereinafter, reference may be made to the method, the apparatus and the device for determining a network anomaly behavior in the above description The readable storage medium stores a computer program. The readable storage medium is executed by a processor to implement steps of the method for determining a network anomaly behavior according to any one of the above embodiments.

In order to more clearly prove the superiority of the method for determining a network anomaly behavior according to the present disclosure, a simulation experiment is made on KDD Cup99 data set. The data set is formed by processing DARPA data by professors from Columbia University and North Carolina State University through data mining technology. The data set includes five types of attacks (i.e., Normal, DOS, Probing, R2L, U2R) of data, and is further divided into 22 kinds of attack behaviors of data. In the data set, only 8 kinds of attack behaviors of data are included in a training set, and the other 14 kinds of attack behaviors of data are included in a test set.

In order to more quickly implement the data clustering, the data set may be pre-processed first, so as to convert discrete data in the data set into continuous data, and then standardization and normalization are performed on data points.

The standardization for data points may be performed according to the following formula:

$$X'_{ij} = \frac{X_{ij} - AVG_j}{STAD_j}$$

$$AVG_j = \frac{1}{n}(X_{1j} + X_{2j} + \ldots + X_{nj})$$

$$STAD_j = \frac{1}{n}(|X_{1j} - AVG_j| + |X_{2j} - AVG_j| + \ldots + |X_{nj} - AVG_j|)$$

Where $X_{ij}'$ represents a standardized value of $X_{ij}$, $AVG_j$ represents an average value of the data, and $STAD_j$ an average absolute deviation of the data.

The normalization for data refers to normalize the standardized data into an interval of [0, 1]. The normalization may be performed according to the following formula:

$$X''_{ij} = \frac{X'_{ij} - X_{min}}{X_{max} - X_{min}}, X_{min} = \min\{X'_{ij}\}, X_{max} = \max\{X'_{ij}\}$$

Where $X_{ij}''$ represents a normalized value of $X_{ij}''$, $X_{min}$ and $X_{max}$ respectively represent a minimum value and a maximum value in the standardized data.

A part of data is extracted in proportion from the KDD Cup99 data set, to serve as a training set and a test set. The training set and the test set are divided into four groups for separate testing. In each group, there are 4890 pieces of normal behavior data and 110 pieces of anomaly behavior data. The test data set for anomaly behaviors is shown in Table 1.

TABLE 1

| Test set | Number of records | Number of normal records | Number of attack records | Number of type of attacks |
|---|---|---|---|---|
| Test1 | 5000 | 4890 | 110 | 4 |
| Test2 | 5000 | 4890 | 110 | 3 |
| Test3 | 5000 | 4890 | 110 | 4 |
| Test4 | 5000 | 4890 | 110 | 2 |

A detection rate and a false detection rate are served as a criteria, specifically:

Detection rate=(the number of data pieces of detected anomaly behavior)/(a total number of anomaly behaviors);

False detection rate=(the number of data pieces of normal behaviors detected as anomaly behaviors)/(a total number of normal behaviors).

The test data set is processed by means of a traditional K-means algorithm and a K-means algorithm fused with Gaussian random numbers respectively, to acquire classification results as shown in Table 2.

TABLE 2

| | Traditional K-means algorithm | | K-means algorithm fused with Gaussian random numbers | |
|---|---|---|---|---|
| Test set | Detection rate | False detection rate | Detection rate | False detection rate |
| Test1 | 72.7 | 9.6 | 91.5 | 6.3 |
| Test2 | 79.3 | 9.1 | 83.0 | 6.7 |
| Test3 | 72.4 | 9.4 | 91.0 | 6.0 |
| Test4 | 71.7 | 8.9 | 93.0 | 5.4 |
| Average value | 74.0 | 9.3 | 88.7 | 6.1 |

The test data set is processed by means of the method according to the present disclosure, to acquire classification results as shown in Table 3.

TABLE 3

| Test set | Detection rate | False detection rate |
|---|---|---|
| Test1 | 95.9 | 0.13 |
| Test2 | 98.2 | 0.07 |
| Test3 | 91.3 | 1.80 |
| Test4 | 95.4 | 0.11 |
| Average value | 95.2 | 0.53 |

It can be seen from Table 3 that the present disclosure has a good effect in detecting a network anomaly behavior. Compared with the traditional K-means algorithm and the K-means algorithm fused with Gaussian random numbers, the detection rate is significantly improved, the average value has increased to 95.2%, and an average false detection rate has dropped to less than 1%.

In order to better test the detection effect of the present disclosure on a network anomaly behavior, it may be used the K-means algorithm and the method according to the present disclosure to process a same type of attacks. Reference is made to Table 4.

TABLE 4

| | Detection rate | | False detection rate | |
|---|---|---|---|---|
| Type of attacks | K-means | Present disclosure | K-means | Present disclosure |
| U2R | 0 | 95 | 100 | 3.2 |
| R2L | 80 | 98 | 23.7 | 0.7 |
| DOS | 83 | 97 | 20.1 | 2.8 |
| Probe | 90 | 100 | 26.3 | 0 |

It can be seen that the detection effect of the traditional K-means algorithm on U2L and R2L is not good. The two types of attacks are both disguised as normal behaviors of users to implement the attacks, and thus, features of the two types of attacks of data are similar to features of normal behaviors. Moreover, the number of the two types of attacks of data is small. However, the present disclosure has a better detection effect on the four types of attacks, especially the Probe attack which has been fully detected.

The embodiments in the specification are described in a progressive way, and each embodiment lays emphasis on differences from other embodiments. For the same or similar parts between various embodiments, reference may be made to each other.

Based on the above description of the disclosed embodiments, those skilled in the art may implement or practice the present disclosure. Many modifications to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principle and novel features disclosed herein.

The invention claimed is:

1. A method for determining a network anomaly behavior, comprising:

acquiring network data traffic in a target network, and determining each data packet contained in the network data traffic as a node of a complete graph, to construct a data complete graph;

optimizing the data complete graph into a minimum spanning tree by using Kruskal algorithm based on weights of all edges in the data complete graph, and determining each node of the minimum spanning tree as a cluster center, wherein for each edge in the data complete graph, a length of the edge is determined as the weight of the edge;

classifying all data packets contained in the network data traffic based on cluster centers, to acquire data element sets corresponding to the cluster centers respectively; and determining an anomaly behavior in the target network based on a type of each of the data element sets, wherein the type of the data element set is determined by a type of a network attack contained in the network data traffic.

2. The method for determining a network anomaly behavior according to claim 1, wherein after acquiring the data element sets corresponding to the cluster centers respectively, the method further comprises:

calculating, for each of the data element sets, a ratio of an intra-cluster distance to an inter-cluster distance of the data element set, and determining whether ratios of the intra-cluster distance to the inter-cluster distance of all the data element sets are less than a preset first threshold;

performing steps of determining the anomaly behavior in the target network based on a type of each of the data element sets, in response to determining that the ratios of the intra-cluster distance to the inter-cluster distance of all the data element sets are less than the preset first threshold.

3. The method for determining a network anomaly behavior according to claim 2, wherein when there is a ratio greater than or equal to the preset first threshold, the method further comprises:

updating each cluster center according to an objective formula, and performing steps of classifying all data packets contained in the network data traffic based on cluster centers to acquire data element sets corresponding to the cluster centers respectively, wherein the objective formula is: $G'=G(X,Y,Z), X=(x_1m_1+x_2m_2+\ldots+x_im_i)/M, Y=(y_1m_1+y_2m_2+\ldots+y_im_i)/M, Z=(z_1m_1+z_2m_2+\ldots+z_im_i)/M,$ wherein G' represents an updated cluster center, M represents, before updating, a sum of distances between the cluster center and each data element in the data element set corresponding to the cluster center, and X, Y and Z respectively represent coordinates of the updated cluster center in a three-dimensional space; and $m_1, m_2 \ldots m_i$ respectively represent, before updating, a distance between each data element in the data element set and the cluster center corresponding to the data element set, $x_1, x_2 \ldots x_i$ respectively represent, before updating, a X coordinate value of each data element in the data element set mapped to the three-dimensional space, $y_1, y_2 \ldots y_i$ respectively represent, before updating, a Y coordinate value of each data element in the data element set mapped to the three-dimensional space, and $z_1, z_2 \ldots z_i$ respectively represent, before updating, a Z coordinate value of each data element in the data element set mapped to the three-dimensional space.

4. The method for determining a network anomaly behavior according to claim 3, wherein before determining an anomaly behavior in the target network based on a type of each of the data element sets, the method further comprises:

calculating a function value of an objective function, and determining whether a difference between the calculated function value and an initial function value is less than a preset second threshold; and performing steps of determining an anomaly behavior in the target network based on a type of each of the data element sets, in response to determining that the difference between the calculated function value and the initial function value is less than the preset second threshold.

5. The method for determining a network anomaly behavior according to claim 4, wherein when the difference between the calculated function value and the initial function value is greater than or equal to the preset second threshold, the method further comprises:

determining the calculated function value as the initial function value, and performing steps of updating each cluster center according to the objective formula.

6. The method for determining a network anomaly behavior according to claim 1, wherein the classifying all data packets contained in the network data traffic based on cluster centers, to acquire data element sets corresponding to the cluster centers respectively comprises:

acquiring, for each of the cluster centers, the data element set corresponding to the cluster center according to the following steps:

removing a target cluster center from the data packets contained in the network data traffic, to acquire a target data packet set;

for each data element in the target data packet set, calculating a distance between the data element and the target cluster center, and determining whether the distance is less than a preset radius value; and dividing the data element into a data element set corresponding to the target cluster center, in response to determining that the distance is less than the preset radius value.

7. The method for determining a network anomaly behavior according to claim 6, further comprising:

calculating a first cosine similarity between a target data element and any one of the data elements in the data element set corresponding to the target cluster center, and a second cosine similarity between the target data element and any one of data elements in a data element set corresponding to an object cluster center, in a case that a first distance between the target data element and the target cluster center, and a second distance between the target data element and the object cluster center are both less than the radius value;

determining whether the first cosine similarity is greater than the second cosine similarity;

dividing the target data element into the data element set corresponding to the target cluster center, if it is determined that the first cosine similarity is greater than the second cosine similarity; and dividing the target data element into the data element set corresponding to the object cluster center, if it is determined that the first cosine similarity is less than or equal to the second cosine similarity.

8. A device for determining a network anomaly behavior, comprising
a memory, configured to store a computer program; and
a processor, configured to execute the computer program to implement steps of the method for determining a network anomaly behavior according to claim 1.

9. A device for determining a network anomaly behavior, comprising
a memory, configured to store a computer program; and
a processor, configured to execute the computer program to implement steps of the method for determining a network anomaly behavior according to claim 2.

10. A device for determining a network anomaly behavior, comprising
a memory, configured to store a computer program; and
a processor, configured to execute the computer program to implement steps of the method for determining a network anomaly behavior according to claim 3.

11. A device for determining a network anomaly behavior, comprising
a memory, configured to store a computer program; and
a processor, configured to execute the computer program to implement steps of the method for determining a network anomaly behavior according to claim 4.

12. A device for determining a network anomaly behavior, comprising
a memory, configured to store a computer program; and
a processor, configured to execute the computer program to implement steps of the method for determining a network anomaly behavior according to claim 5.

13. A device for determining a network anomaly behavior, comprising
a memory, configured to store a computer program; and
a processor, configured to execute the computer program to implement steps of the method for determining a network anomaly behavior according to claim 6.

14. A device for determining a network anomaly behavior, comprising
a memory, configured to store a computer program; and
a processor, configured to execute the computer program to implement steps of the method for determining a network anomaly behavior according to claim 7.

15. A non-transitory readable storage medium storing a computer program, wherein the computer program is executed by a processor to implement steps of the method for determining a network anomaly behavior according to claim 1.

16. A non-transitory readable storage medium storing a computer program, wherein the computer program is executed by a processor to implement steps of the method for determining a network anomaly behavior according to claim 2.

17. A non-transitory readable storage medium storing a computer program, wherein the computer program is executed by a processor to implement steps of the method for determining a network anomaly behavior according to claim 3.

18. A non-transitory readable storage medium storing a computer program, wherein the computer program is executed by a processor to implement steps of the method for determining a network anomaly behavior according to claim 4.

19. A non-transitory readable storage medium storing a computer program, wherein the computer program is executed by a processor to implement steps of the method for determining a network anomaly behavior according to claim 5.

* * * * *